United States Patent [19]

Secord

[11] Patent Number: 4,733,912
[45] Date of Patent: Mar. 29, 1988

[54] INERTIA SENSITIVE SEAT HINGE MECHANISM

[75] Inventor: Tyrone R. Secord, Sterling Heights, Mich.

[73] Assignee: Fisher Dynamics Corporation, St. Clair Shores, Mich.

[21] Appl. No.: 925,073

[22] Filed: Oct. 30, 1986

[51] Int. Cl.[4] .............................................. B60N 1/02
[52] U.S. Cl. ...................... 297/379; 297/362
[58] Field of Search .................. 297/379, 378, 341

[56] References Cited

U.S. PATENT DOCUMENTS

| | | |
|---|---|---|
| 3,405,971 | 10/1968 | Kobrehel . |
| 3,638,999 | 2/1972 | Tischler ............................. 297/379 |
| 4,010,979 | 3/1977 | Fisher, III et al. . |
| 4,118,067 | 10/1978 | Tanaka ............................. 297/379 |
| 4,165,128 | 8/1979 | Strowick et al. ................. 297/379 |
| 4,223,946 | 9/1980 | Kluting . |
| 4,252,370 | 2/1981 | Kluting et al. . |
| 4,294,488 | 10/1981 | Pickles ............................. 297/379 |
| 4,318,569 | 3/1982 | Bilenchi et al. ................. 297/379 |
| 4,366,984 | 1/1983 | Klueting et al. ................. 297/379 |
| 4,429,919 | 2/1984 | Klueting et al. ................. 297/379 |
| 4,438,974 | 3/1984 | Kresky et al. ................... 297/379 |
| 4,518,190 | 5/1985 | Kluting et al. . |
| 4,579,387 | 4/1986 | Bell ................................. 297/379 |

Primary Examiner—Francis K. Zugel
Attorney, Agent, or Firm—Harness, Dickey & Pierce

[57] ABSTRACT

An improved inertia sensitive seat hinge mechanism which enables the seat back to be normally folded forwardly to permit access to a motor vehicle rear compartment area which locks when exposed to a predetermined acceleration load. The inertia sensitive actuator is in the form of a generally straight lever which is mounted for rotation to the upper hinge structure. A projecting finger of the inertia sensitive pendulum interacts with a cam surface associated with the lower recliner structure to maintain the inertia device in an engaged position when the seat back is in its rearmost folded position. This positioning improves reliability of the hinge device. The configuration of components according to this invention eliminates the objectionable rearward projection presented by many present seat hinge designs which can interfere with free access to the rear compartment area. The configuration further permits the mounting of an emergency release lever which is located close to the junction between the upper and lower hinge structures, thus simplifying trimming of the seat. The hinge mechanism according to this invention is further extremely simple in configuration and operation.

8 Claims, 4 Drawing Figures

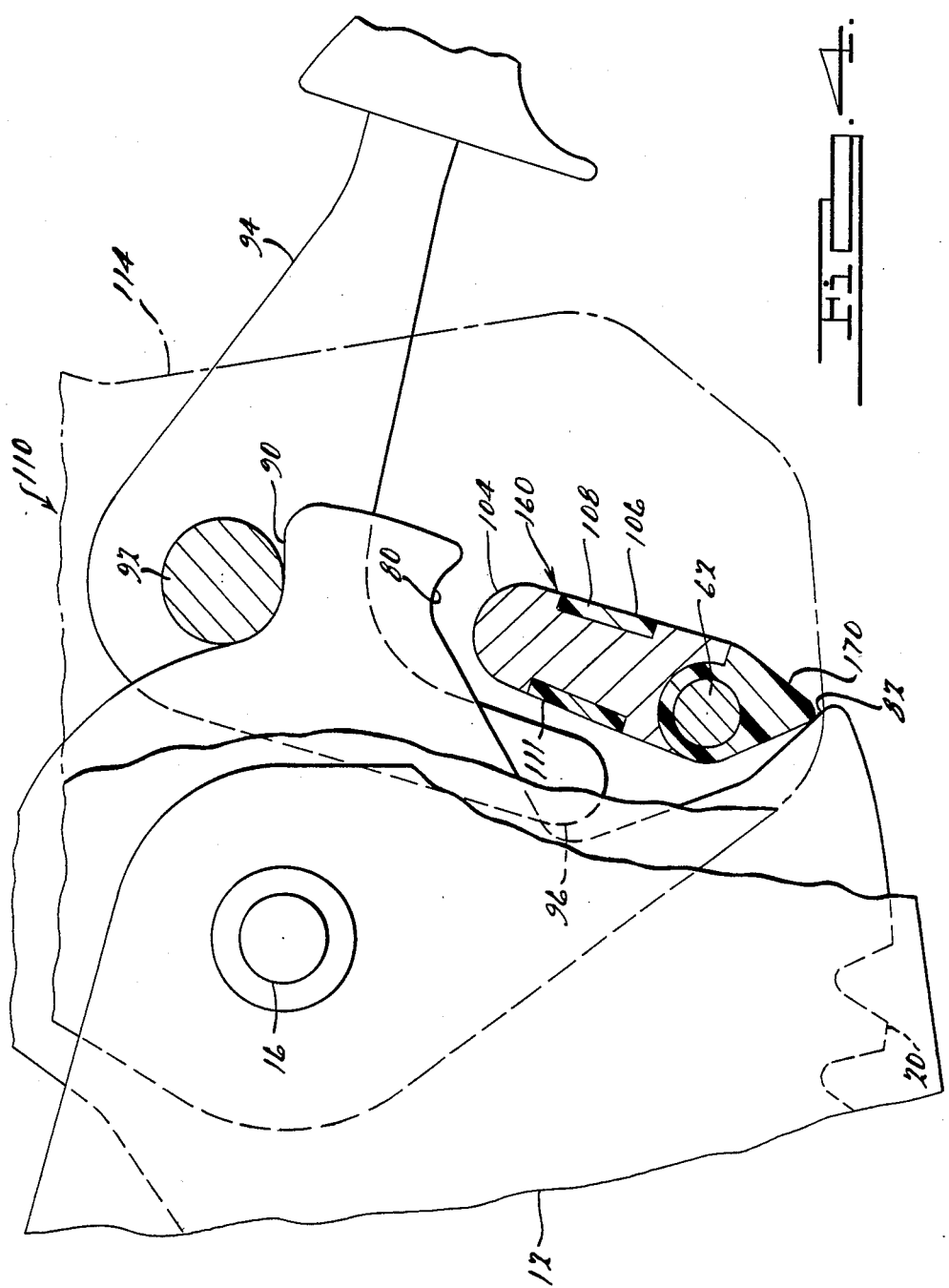

INERTIA SENSITIVE SEAT HINGE MECHANISM

BACKGROUND AND SUMMARY OF THE INVENTION

This invention relates to an improved seat hinge mechanism and more particularly to one adapted for use with a motor vehicle occupant seat which permits the seat back to be normally folded forward to permit access to a rear compartment area but which locks to prevent folding when vehicle predetermined forward deceleration loads are sensed.

Most present passenger motor vehicles have a rear seat occupant or luggage compartment area. In two-door style vehicles, a means for accessing such areas is necessary. Ordinarily, such access is provided through the use of a front seat having a seat back which is foldable in a forward direction relative to the seat bottom. Present Federal Motor Vehicle Safety Standards applicable in the United States require a locking mechanism which restrains forward rotation of a folding type seat back in the event of a frontal collision. In the past, folding seats were provided with a manually actuated seat back latch. As a means of improving user convenience, many modern motor vehicle models incorporate an inertia sensitive element within the seat hinge mechanism which enables the seat back to be folded forward without significant resistance when the vehicle is at rest or during ordinary operating conditions. In the event, however, that the vehicle is subjected to a forward deceleration load, such as experienced during hard braking or frontal impact, the seat hinge mechanism is latched to restrict forward rotation of the seat back. Many presently available seat hinge mechanisms incorporating inertia sensitive locking devices further provide a mechanism for positioning the inertia sensitive element in an engaged position when the seat back is folded to its rearmost position. For such mechanisms, the inertia sensitive actuator is freed to move between engaged and released positions once the seat back is folded forwardly several degrees. In the event that the vehicle is subjected to deceleration loads above a predetermined level, the inertia sensitive actuator remains in an engaged position, thus preventing forward seat back rotation. Such seat hinge designs which position the inertia sensitive element in an engaged position when the seat is folded back have the advantage that they continually cause the element to be moved between engaged and released positions, thus reducing the likelihood that corrosion, foreign matter, etc. would interfere with free movement of the actuator.

Although seat hinge mechanisms having the above-discussed features are presently known, there is a continuing need to provide improvements for such mechanisms. Designers of mass-produced components such as those used in modern motor vehicles are constantly striving to reduce their complexity and cost. Many present designs of seat hinge mechanisms having the above-discussed features present an edge surface which protrudes toward the rear seat area when the seat back is rotated forward. This edge surface can be objectionable in that rear seat occupants could contact it while entering or egressing the rear seat area. Accordingly, it is desirable to provide a seat hinge which does not interfere with free access to the rear compartment area. Seat reclining mechanisms having inertia sensitive actuators are required to have an emergency release which overcomes the inertia sensitive actuator to enable a rear seat occupant to release the seat back in an emergency condition to permit escape from the vehicle. Emergency releases are typically in the form of a manually operable handle which acts on the inertia sensitive element to forcibly move it to a freeing position. Since the emergency release actuator must be accessible to the rear seat occupant, it is necessary to provide a lever which protrudes from the seat back and therefore the seat trim must accommodate such protrusion. In order to simplify trimming of the seat back, it is desirable to locate the emergency release actuator at a position near the pivot of the seat back and seat bottom.

The hinge mechanism in accordance with this invention achieves the above-mentioned desirable characteristics. The hinge structure incorporates a component carried by the lower hinge structure which forms a stop surface and an actuator biasing surface. An inertia sensitive pawl having its center of gravity located above and behind its center of rotation is provided which interacts with the stop surface when the vehicle is subjected to a forward deceleration above a predetermined value, thus preventing forward seat back rotation. The actuator biasing surface engages the actuator to urge it to an engaged position when the seat is in its rearmost position. The inertia actuator according to this invention is compact and simple in construction and operation. The configuration and placement of the inertia actuator according to this invention permits the emergency release mechanism to be positioned at a point near the junction between the upper and lower seat hinge structures, thereby simplifying trimming of the seat.

Additional benefits and advantages of the present invention will become apparent to those skilled in the art to which this invention relates from the subsequent description of the preferred embodiments and the appended claims taken in conjunction with the accompanying drawings.

BRIEF DESCRIPTION OF THE DRAWINGS

FIG. 4 is a partial side elevational view similar to FIGS. 2 and 3, but showing a seat hinge mechanism with an inertia sensitive actuator in accordance with a second embodiment of this invention.

DETAILED DESCRIPTION OF THE INVENTION

Figure 1:
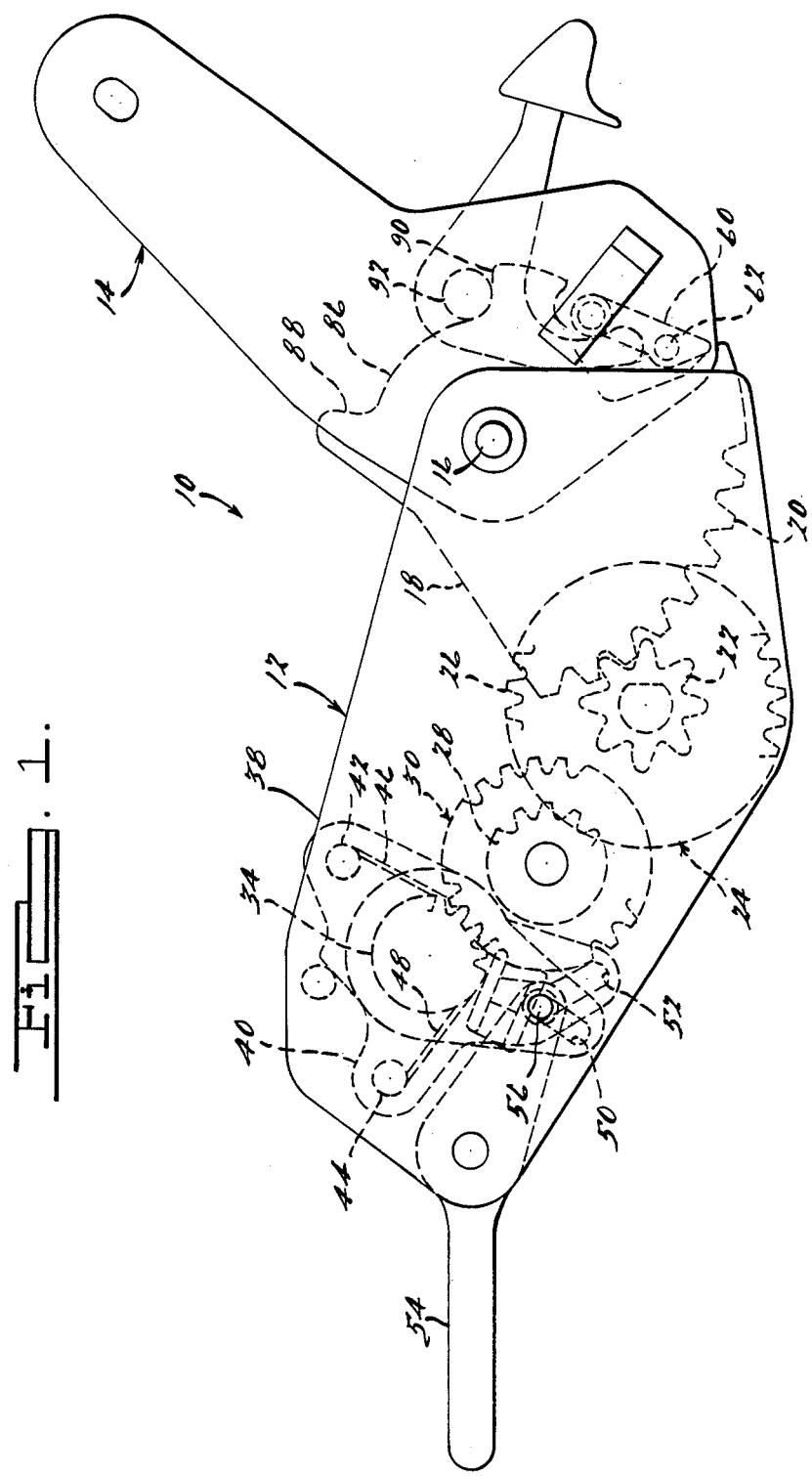
FIG. 1 is a side elevational view of a seat hinge mechanism in accordance with a first embodiment of this invention.

A motor vehicle sest hinge mechanism according to a first embodiment of this invention is shown in FIGS. 1 through 4 and is generally designated by reference number 10. The embodiment of hinge mechanism 10 described herein and shown by the accompanying Figures is intended to be positioned at the lefthand side of a motor vehicle's driver's seat. A hinge mechanism adapted for a front passenger's seat would preferably employ components which are mirror image replications or which are oriented differently than those described and shown herein. Seat hinge mechanism 10 includes lower hinge structure 12 which becomes attached to a seat bottom frame (not shown). Upper hinge structure 14 becomes attached to a seat back frame (not shown) and is adapted to pivot with respect to lower hinge structure 12 about pivot pin 16. Lower and upper hinge structures 12 and 14 are fabricated by attaching a pair of separated plates. These plates are fixed together by rivets or welding and define a space therebetween which accommodates additional components which are described below.

Seat hinge mechanism 10 shown by the appended Figures includes elements which enable the angle of upper hinge structure 14 to be controllably varied, thus providing an adjustable reclining feature. Such features are, however, optional since the novel aspects of this invention may be provided in a hinge structure which does not incorporate a reclining feature. Numerous mechanisms for providing seat reclining are known. The reclining mechanism described and shown herein is substantially identical to that described and claimed in co-pending patent application Ser. No. 753,047, filed on July 1, 1985, which is hereby incorporated by reference. Quadrant 18 establishes the angular positioning of upper hinge structure 14 during normal use of the seat. Quadrant 18 is rotatable about pivot pin 16 and defines a curved toothed rack 20. Rack 20 meshes with small gear portion 22 of gear 24. Large gear portion 26 of gear 24 in turn meshes with small gear portion 28 of gear 30. Large gear portion 32 of gear 30 meshes with gear 33 which drives rotatable actuator drum 34. The provision of gears 24 and 30 provides a gear torque reduction such that actuator drum 34 is rotated relatively rapidly with respect to the rate of rotation of quadrant 18. Such gearing arrangement reduces the magnitude of torque which must be applied onto actuator drum 34 to restrain rotation of upper hinge structure 14.

Rotation of actuator drum 34 is selectively restrained or permitted through the action of actuator spring 36 which is wrapped around actuator drum 34. Rivets 42 and 44 engage cam plates 38 and 40 to restrain ends 46 and 48 of actuator spring 36. Cam plates 38 and 40 further define cam surfaces 50 and 52 which interact with pin 56 of actuator lever 54 to control rotation of actuator drum 34. When actuator lever 54 is rotated in a clockwise direction (with respect to the orientation of components shown in FIG. 1), pin 56 interacts with cam surfaces 50 and 52 to cause relative rotation between cam plates 38 and 40. Such rotation unwraps actuator spring 36 from actuator drum 34, thereby releasing the drum and permitting it to freely rotate, thus allowing changes in the reclined position of upper hinge structure 14. Conversely, when actuator lever 54 is in its normal position as shown in FIG. 1, actuator spring 36 is wrapped upon actuator drum 34 such that it frictionally engages the drum and restrains its free rotation, thus fixing the position of upper hinge structure 14. Additional details regarding the method of operation and description of the components of the reclining mechanism described above are provided within the above-mentioned co-pending patent application.

Figure 2:
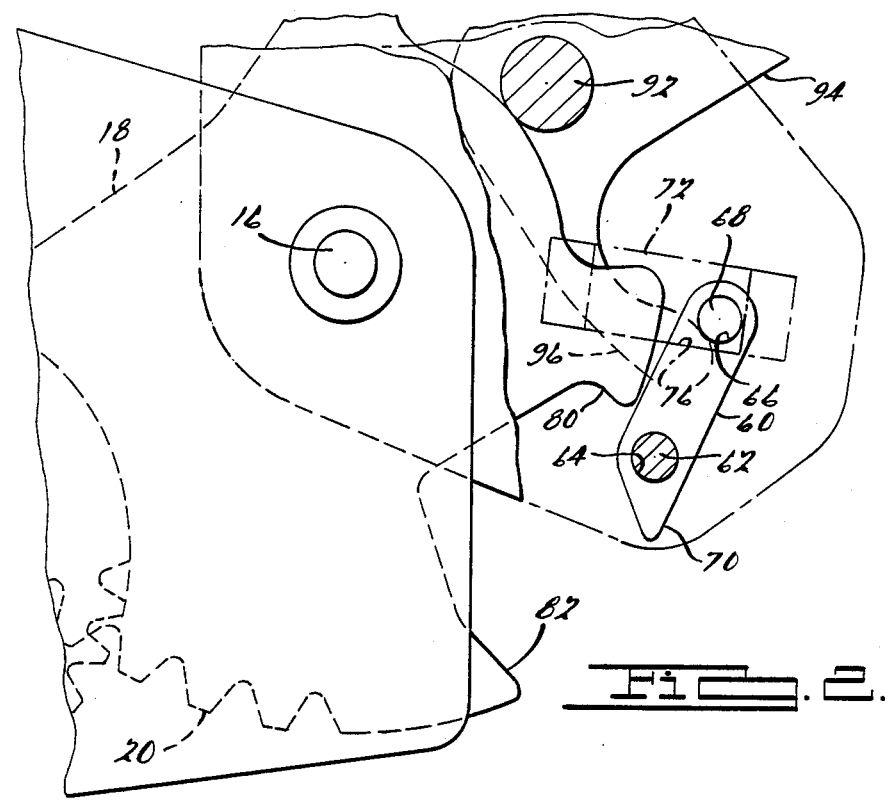
FIG. 2 is a partial side elevational view particularly showing the inertia sensitive actuator and quadrant components of FIG. 1 shown in a released position with the seat back folded forward.
Figure 3:
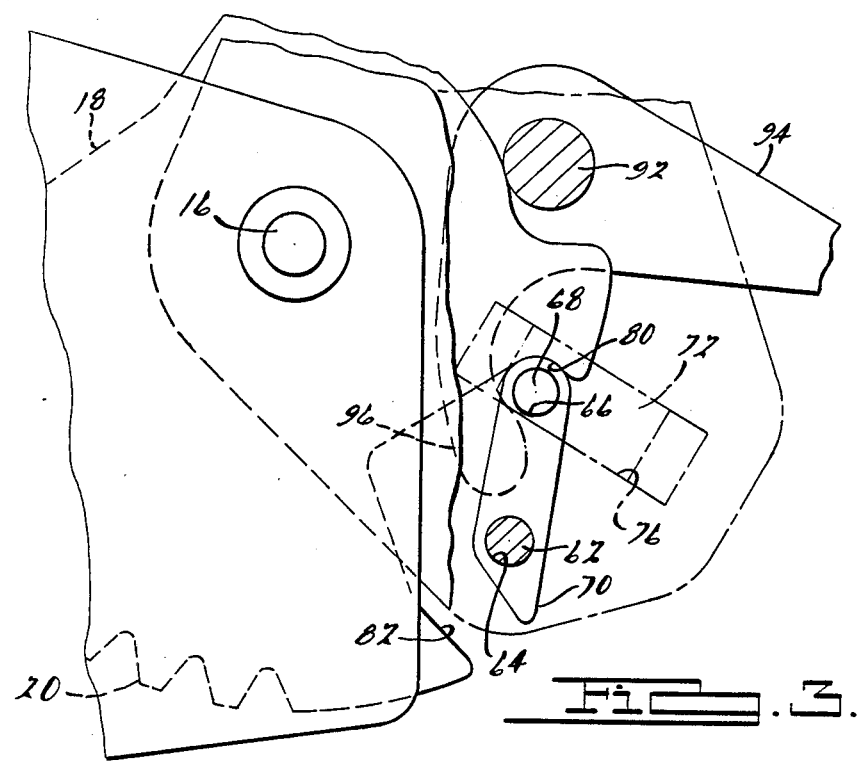
FIG. 3 is a partial side elevational view particularly showing the inertia sensitive actuator and quadrant component of FIG. 1 in an engaged position.

In accordance with a principal feature of this invention, hinge mechanism 10 incorporates a novel means for providing an inertia sensitive actuating mechanism. As shown in FIGS. 1 through 3, inertia actuator 60 is provided having bores 64 and 66. Actuator 60 is rotatable about pin 62 affixed to upper hinge structure 14 which passes through bore 64. The embodiment according to FIGS. 1 through 3 may include an actuator 60 made from relatively soft material such as a polymeric plastic. Engaging pin 68 is carried by bore 66. The lowermost portion of actuator 60 defines a projecting finger portion 70. The plates making up upper hinge structure 14 feature locally outwardly deflected portions 72 and 74 (not shown) which define edges 76 and 78 (not shown). Engaging pin 68 is longer than the separation distance between the plates making up upper hinge structure 14, but shorter than the separation between portions 72 and 74. Accordingly, engaging pin 68 is trapped to move in the area outlined by portions 72 and 74.

Quadrant 18, or a corresponding structure of lower hinge structure 12, has a pair of separated edge features including stop surface 80 and actuator biasing surface 82, both of which interact with inertia sensitive actuator 60. Stop surface 80 is adapted to interact with engaging pin 68 in emergency situations, as will be better explained hereinafter. Actuator biasing surface 82 is provided to act on finger portion 70 to urge inertia sensitive actuator 60 to an engaged position when upper hinge structure 14 is in its folded rearward position. Qaudrant 18 further defines an arcuate edge 86 bounded by a pair of projections 88 and 90. Pin 92 affixed to upper hinge structure 14 is located to travel along arcuates surface 86 and engages with projections 88 and 90 at the extreme ranges of folding motion of upper hinge structure 14.

Emergency release lever 94 is provided to act upon inertia sensitive actuator 60 to forceably move it to a released position in emergency conditions. Emergency release lever 94 is mounted for rotation about pin 92 and includes tab 96 which engages inertia sensitive actuator 60. In emergency situations in which actuator 60 remains in engagment, an upward lifting of release lever 94 causes it to rotate in a counterclockwise direction and tab 96 urges actuator 60 to rotate clockwise to the released position.

Operation of seat hinge mechanism 10 will now be described with particular reference to FIGS. 1 through 3. FIG. 1 represents the relative positioning of the components during normal driving or operation of the motor vehicle. In this condition, upper hinge structure 14 is in its rearward position such that pin 92 rests against projection 90 of quadrant 18. In this position, finger portion 70 of inertia sensitive actuator 60 interacts with actuator biasing surface 82 to rotate the inertia sensitive actuator in a counterclockwise direction. Such biasing positions engaging pin 68 in close proximity with stop surface 80. When it is desired to access a rear compartment area, upper hinge structure 14 is rotated in a forward direction. After a few degrees of initial forward rotation, the interaction between cam surface 82 and finger portion 70 allows actuator 60 to rotate toward its released position. Since the center of gravity of inertia sensitive actuator 60 is vertically above and horizontally rearward of its center of rotation established by pin 62, the actuator is urged by gravity to rotate in a clockwise direction, unless it is subjected to vehicle deceleration forces. Such rotation is illustrated in FIG. 2. In this condition, continued unrestricted forward rotation of upper hinge structure 14 is permitted. FIG. 3 illustrates the positioning of components in the emergency locking condition. Slight forward rotation of the upper hinge structure 14 as mentioned above frees the interaction between finger portion 70 and biasing surface 82. However, in an emergency situation such as a panic stop or frontal impact, a deceleration having a negative value acting in a longitudinal direction relative to the vehicle acts upon all of the elements within the motor vehicle, including inertia sensitive actuator 60. Such deceleration loads urge actuator 60 to rotate in a counterclockwise direction due to the location of its center of gravity relative to its axis of rotation. Accordingly, in such conditions, inertia sensitive actuator 60 is not free to escape engagement with stop surface 80. Once stop surface 80 contacts engaging pin 68, the pin is urged into engagement with edges 76 and 78 defined by upper hinge structure 14. Such engagement loads engaging pin 68 in shear and interferes with continued rotation of the upper hinge structure.

The above-described configuration and cooperation of elements of seat hinge mechanism 10 provide a number of desirable features. The positioning and location of actuator biasing surface 82 of quadrant 18 does not present an obtrusive projection which is likely to be contacted by a rear seat occupant. The design is further extremely simple in that it utilize very few components. Additionally, the positioning of inertia sensitive actuator 60 permits emergency release lever 94 to be located close to the axis of rotation of the upper and lower hinge structures 12 and 14 defined by pin 16, which simplifies trimming of the seat.

FIG. 4 illustrates a seat hinge mechanism according to a second embodiment of this invention which is generally designated by reference number 110. Components of hinge mechanism 110 which are identical to those described previously are identified by like reference numbers. Hinge mechanism 110 includes a modified inertia sensitive actuator 160. Inertia sensitve actuator 160 includes engagement lug 104 and attaching member 106. Engagement lug 104 is preferably made of metal and rests against pin 62. Attaching member 106 is preferably made of a polymeric plastic and includes a pair of fingers 108 and 111 which embrace engagment lug 104. Attaching member 106 further defines finger portion 170 which interacts with actuator biasing surface 82 as previously described. The center of gravity of actuator 160, like actuator 60, is located vertically above and horizontally behind its axis of rotation defined by pin 62. In accordance with this embodiment, upper recliner structure 114 does not form locally outwardly deflected portions 72 and 74 provide for the first embodiment.

Seat hinge mechanism 110 operates in a manner similar to hinge mechanism 10 described above. Engagement between inertia sensitive actuator 160 and quadrant 18, however, results in a compressive loading of engagement lug 104, since it is interposed between the relatively moving stop surface 80 and pin 62. This design has the advantage of a further reduction in number of parts and eliminates the necessity of providing outwardly deflected portions 72 and 74 according to the first embodiment, thus providing a thinner upper recliner structure. Attaching member 106 may be made of softer material than engagement lug 104 since it does not restrain the compressive loading carried by the engagement lug.

While the above description constitutes the preferred embodiments of the present invention, it will be appreciated that the invention is susceptible to modification, variation and change without departing from the proper scope and fair meaning of the accompanying claims.

What is claimed is:

1. In an inertia sensitive seat hinge mechanism for supporting a seat back and a seat bottom which permits said seat back to be rotated relative to said seat bottom under normal operating conditions but which restricts rotation of said seat back when said hinge mechanism is exposed to an acceleration above a predetermined level in a predetermined direction, said seat hinge of the type having an upper hinge structure for supporting said seat back and a lower hinge structure for supporting said seat bottom, said upper hinge structure rotatable with respect to said lower hinge structure about a pivot pin, an inertia sensing means comprising:

quadrant means operatively connected to said lower hinge structure for defining a stop surface and an actuator biasing surface spaced from said stop surface, an inertia sensitive actuator in the form of a generally straight elongated lever, said actuator defining pivot means adjacent one end thereof, engagement means at the other end thereof, and a projecting finger in close proximity with said pivot means, said pivot means located vertically below and horizontally displaced from said lower hinge structure pivot pin, said actuator mounted for limited rotation such that the center of gravity of said actuator is vertically above and horizontally displaced from said pivot means and said actuator being mounted relative to said quadrant means such that when said seat back is in a folded rearward position, said quadrant actuator biasing surface acts on said projecting finger portion to bias said actuator engagement means to a position of engagment with said stop surface and wherein when said seat back is rotated from said folded rearward position, said actuator biasing surface relieves said bias to permit said actuator engagment means to move out of engagement with said stop surface due to gravity or to remain in said position of engagment due to the influence of said acceleration on said actuator.

2. The inertia sensing means according to claim 1 wherein said pivot means comprises a bore formed by said actuator and a pin passing through said bore which is carried by said upper hinge structure.

3. The inertia sensing means according to claim 1 wherein said engagement means comprises a bore within said actuator adjacent said other end and an engagment pin installed within said bore, said upper hinge structure defining a pair of separated edges wherein when said engagement pin engages said stop surface, said engagement pin engages said edges to interfere with rotation of said seat back.

4. The inertia sensing means according to claim 1 wherein said inertia sensitive actuator is comprised of an engagement lug portion forming said engagement means and extending to said pivot means and an attaching member supporting said engagment means.

5. The inertia sensing means according to claim 4 wherein said pivot means is comprised of said attaching member defining a bore and a pin passing through said bore which is carried by said upper hinge structure.

6. The inertia sensing means according to claim 4 wherein said attaching member defines said finger portion.

7. The inertia sensing means according to claim 1 wherein said quadrant means further defines an arcuate surface bounded by a pair of projections and said upper hinge structure having a stop pin which moves along said arcuate surface and engages said projections to define the range of angular folding motion of said upper hinge structure relative to said lower hinge structure.

8. The inertia sensing means according to claim 7 further comprising an emergency release lever pivotable about said stop pin and having a tab which engages said inertia sensitive actuator to urge said actuator to a released position.

* * * * *